(12) United States Patent
Nolimal

(10) Patent No.: US 10,987,278 B2
(45) Date of Patent: Apr. 27, 2021

(54) PRE-FILLED DRINKING STRAW WITH A CROSS-SLIT VALVE CLOSURE ON BOTH ENDS

(71) Applicant: SISTEKS D.O.O., Ljubljana (SI)

(72) Inventor: Boris Nolimal, Ljubljana (SI)

(73) Assignee: Alterno Labs d.o.o., Ljubljana (SI)

( * ) Notice: Subject to any disclaimer, the term of this patent is extended or adjusted under 35 U.S.C. 154(b) by 0 days.

(21) Appl. No.: 16/064,825

(22) PCT Filed: Dec. 22, 2015

(86) PCT No.: PCT/SI2015/000037
§ 371 (c)(1),
(2) Date: Jun. 21, 2018

(87) PCT Pub. No.: WO2017/111704
PCT Pub. Date: Jun. 29, 2017

(65) Prior Publication Data
US 2019/0000719 A1 Jan. 3, 2019

(51) Int. Cl.
*A61J 7/00* (2006.01)
*A47G 21/18* (2006.01)
(Continued)

(52) U.S. Cl.
CPC .......... *A61J 7/0038* (2013.01); *A47G 21/183* (2013.01); *B29C 45/0441* (2013.01); *B29K 2101/12* (2013.01); *B29L 2023/008* (2013.01)

(58) Field of Classification Search
CPC ..... A61J 7/0038; A47G 21/18; A47G 21/183; A47G 21/185; B29L 2023/008
See application file for complete search history.

(56) References Cited

U.S. PATENT DOCUMENTS

| | | | | |
|---|---|---|---|---|
| 1,254,115 A | * | 1/1918 | Brand | A47G 21/183 206/217 |
| 4,792,333 A | * | 12/1988 | Kidder | A47G 21/183 604/83 |

(Continued)

FOREIGN PATENT DOCUMENTS

| | | |
|---|---|---|
| CA | 2 230 851 C | 7/2006 |
| CN | 101432118 A | 5/2009 |

(Continued)

OTHER PUBLICATIONS

International Search Report dated Aug. 8, 2016, issued in corresponding International Application No. PCT/SI2015/000037, filed Dec. 22, 2015, 2 pages.

*Primary Examiner* — Darren W Gorman
(74) *Attorney, Agent, or Firm* — Christensen O'Connor Johnson Kindness PLLC

(57) ABSTRACT

The invention is characterized in that the straw body (1) is consisting of two or more segments, which are attached together with connection (5) and that the straw body (1) on its both ends has a cross-slit valve (2, 3) closure and the valves (2, 3) and the straw body (1) are integrated by molecular adhesion. The inlet and outlet valves (2, 3) are of a slit type. The straw body (1) is preferably made of a thermoplastic material and the valves (2, 3) are preferably made of elastomer material. The edge of the straw body (1) is shaped to enable larger surface of the connection between the straw body (1) and the valve (2, 3). The said shape is preferably a groove (8). On the wall on the end of the straw body (1) a tongue-shaped groove (9) is formed on the surface side.

10 Claims, 6 Drawing Sheets

(51) Int. Cl.
*B29C 45/04* (2006.01)
*B29K 101/12* (2006.01)
*B29L 23/00* (2006.01)

(56) References Cited

U.S. PATENT DOCUMENTS

| | | |
|---|---|---|
| 5,718,681 A | 2/1998 | Manning |
| 6,273,128 B1 * | 8/2001 | Paczonay .............. F16K 15/147 137/512.3 |
| 9,609,969 B1 * | 4/2017 | Panec .................. A47G 21/185 |
| 2003/0071136 A1 | 4/2003 | Ference |
| 2005/0150894 A1 * | 7/2005 | Stribling ................ A45F 3/16 220/705 |
| 2007/0262164 A1 * | 11/2007 | Gelfand .............. A47G 21/183 239/33 |
| 2008/0075809 A1 * | 3/2008 | Anderson ............ A47G 21/183 426/85 |
| 2008/0300569 A1 * | 12/2008 | Schateikis ........... A47G 21/183 604/403 |
| 2009/0041904 A1 * | 2/2009 | Baron .................. A47G 21/183 426/85 |
| 2010/0092309 A1 | 4/2010 | Hockemeier |
| 2010/0159075 A1 | 6/2010 | Baron |
| 2012/0301579 A1 | 11/2012 | Lee et al. |

FOREIGN PATENT DOCUMENTS

| | | |
|---|---|---|
| CN | 201767666 U | 3/2011 |
| CN | 103289190 A | 9/2013 |
| CN | 103549853 A | 2/2014 |
| CN | 204378751 U | 6/2015 |
| CN | 103040628 B | 10/2015 |
| JP | 2002-345619 A | 12/2002 |
| JP | 2015-501544 A | 1/2015 |
| KR | 10-2010-0092682 A | 8/2010 |
| WO | 2004/100859 A1 | 11/2004 |
| WO | 2008/055296 A1 | 5/2008 |
| WO | 2008/072060 A1 | 6/2008 |
| WO | 2010/054439 A1 | 5/2010 |
| WO | 2014/199957 A1 | 12/2014 |
| WO | 2015/186454 A1 | 12/2015 |

* cited by examiner

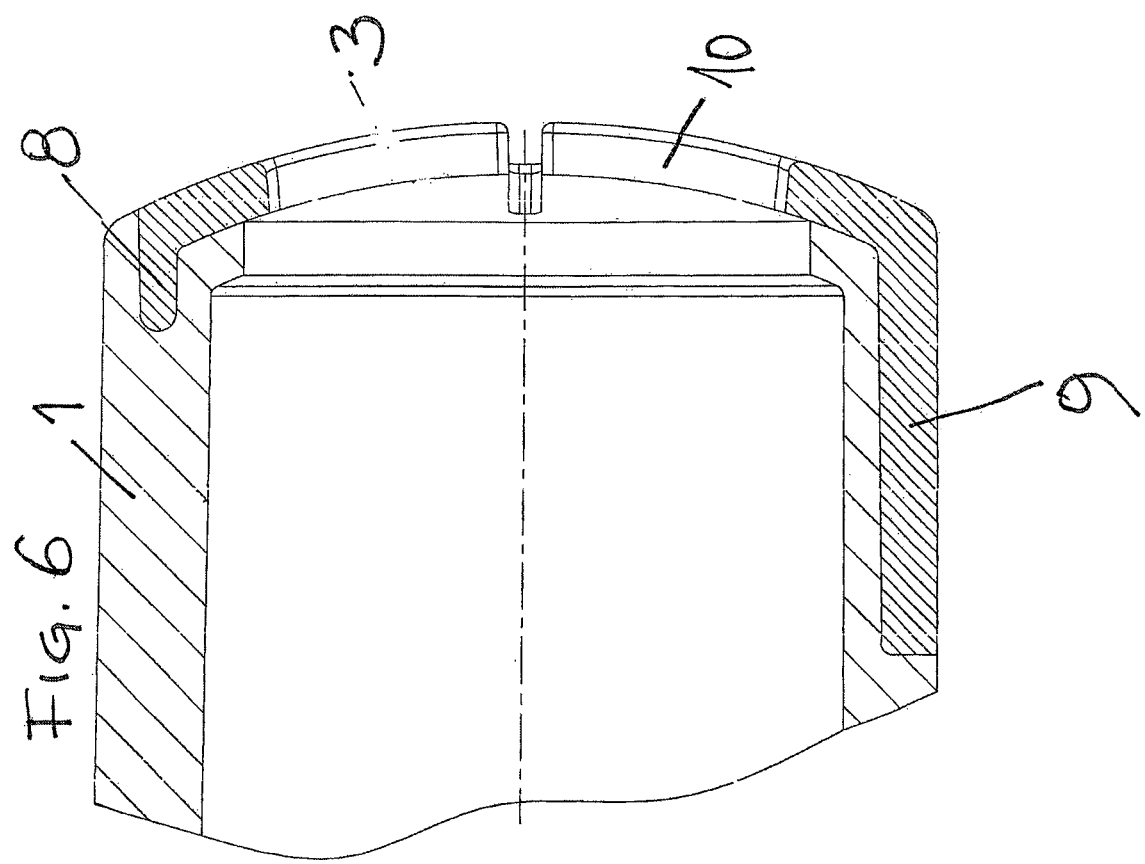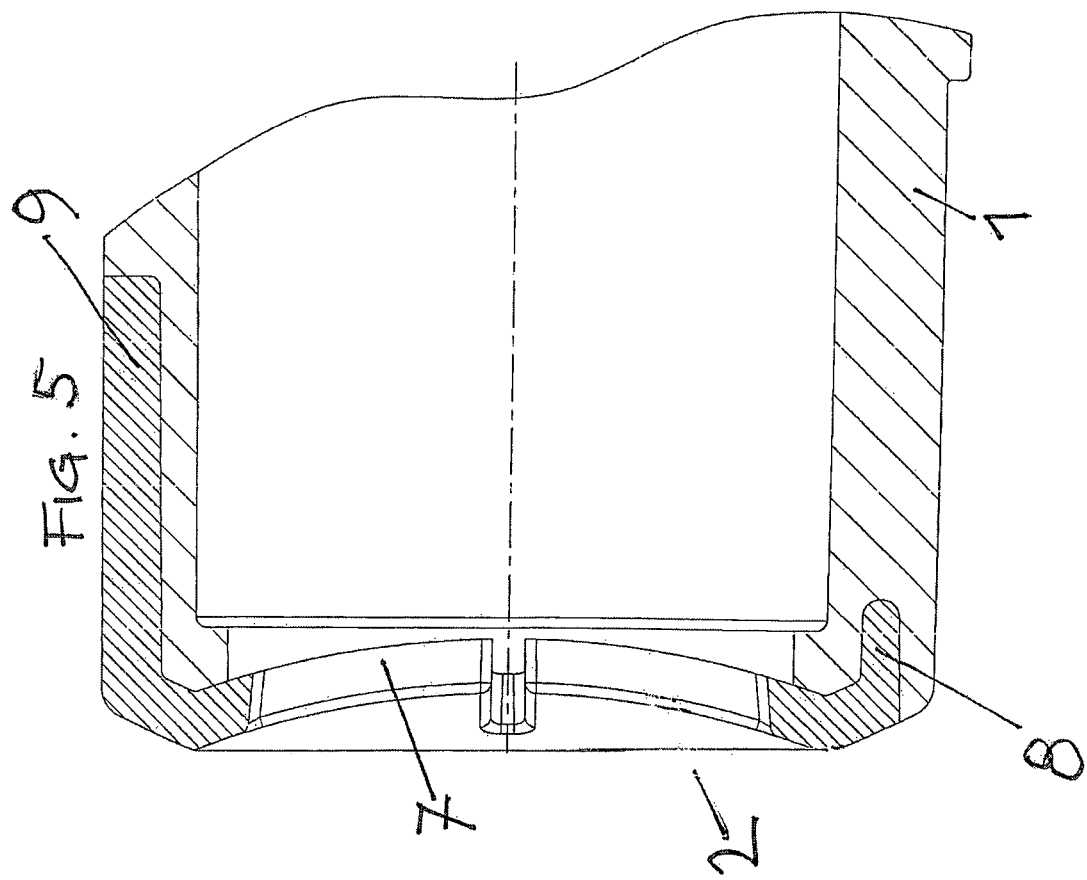

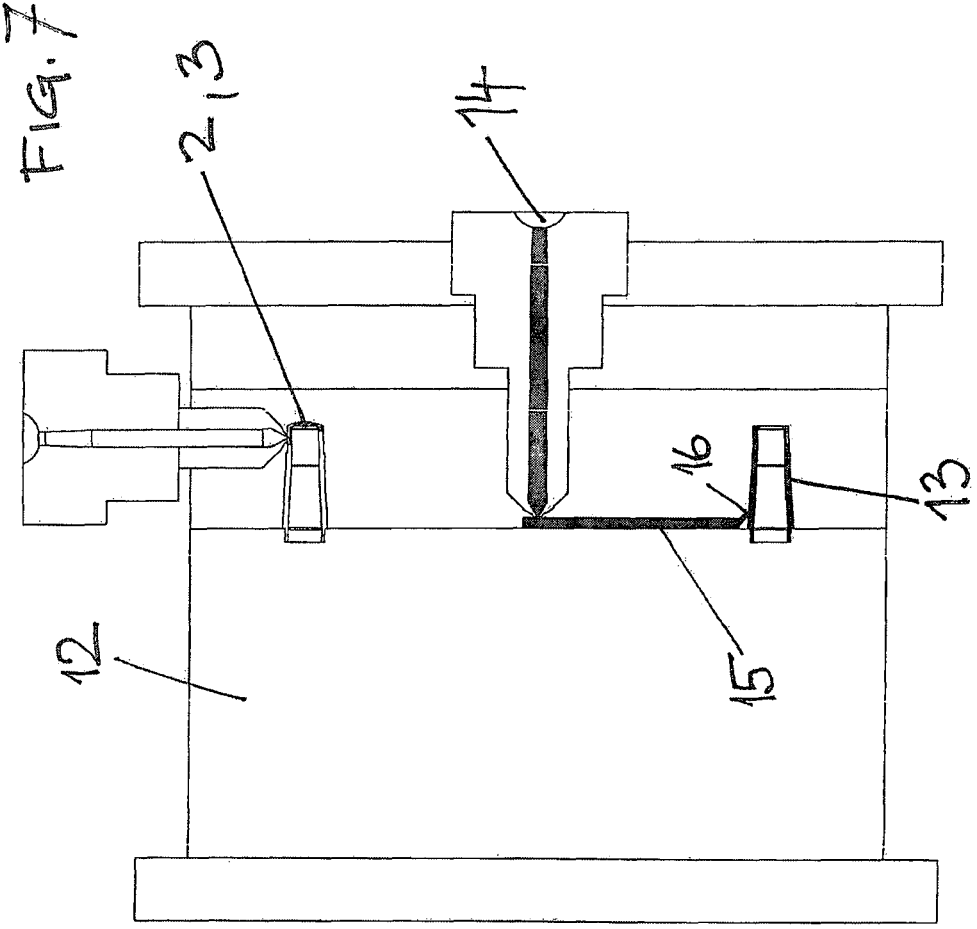

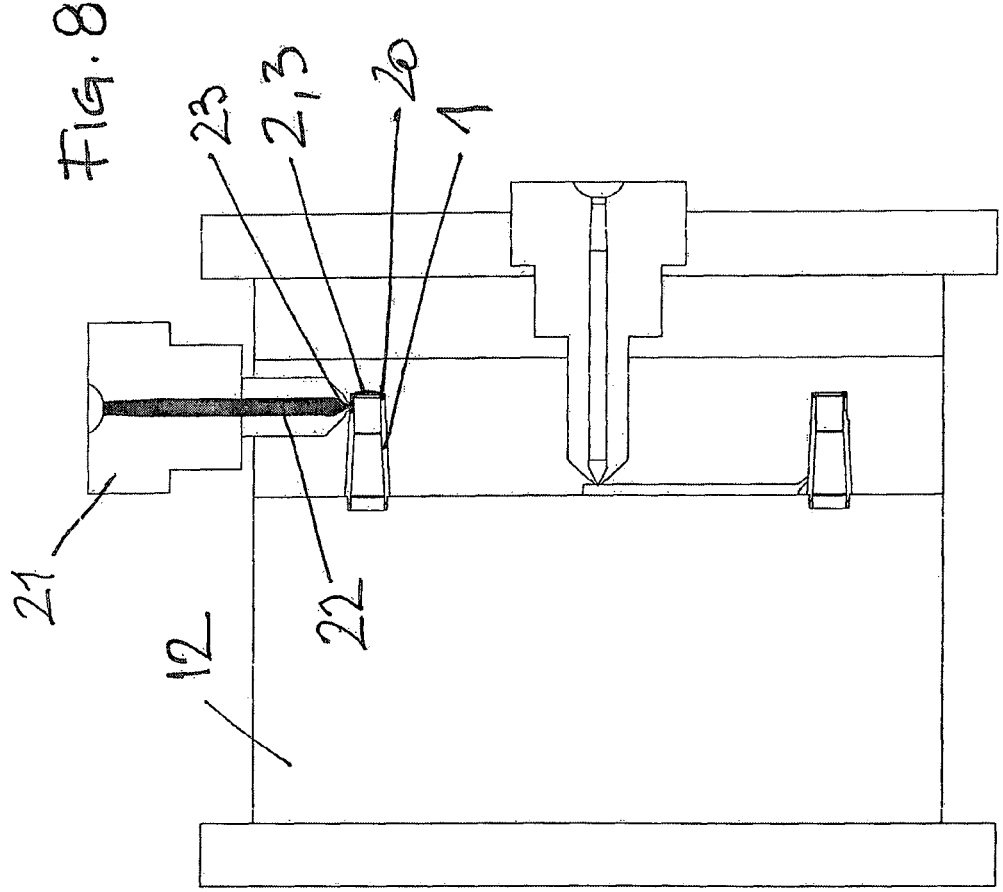
Fig. 8

PRE-FILLED DRINKING STRAW WITH A CROSS-SLIT VALVE CLOSURE ON BOTH ENDS

FIELD OF THE INVENTION

The object of the invention is a pre-filled straw with a cross-slit valve closure on both ends and a process of manufacturing the same. The straw according to the invention is preferably to be used for oral administration of any liquid soluble ingredients, preferably granules, preferably for oral drugs administration. To administer the ingredient which is pre-filled in the straw, the straw has to be with its lower end inserted into the liquid, its upper end is inserted into the mouth and the liquid is sucked. Sucked liquid dissolves the ingredient and the solution is applied to the user.

BACKGROUND

Known pre-filled straws are described in patent documents. In US 2003/0071136 A1 a straw is described with one valve closure impressed into the body of the straw. In CA 2230851 a drink container is described with mouthpiece with inserted valve. Valves and/or filters are added to the straw, meaning that straws and valves and optionally filters are produced separately and the straw is assembled from separate parts in later. The known designs of the straws use one way valve on either inlet or outlet, and use different types of closures, i.e. caps, grids and/or filters of different mesh sizes as closures of other opening. Generally, the straw is assembled from the straw body and the closure mechanism which is inserted into the straw—either valve or filter or other form of barrier. This leads to additional assembly steps in production as well as to a need for the use of additional design features preventing closure to fall out of the straw before or during use.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, this disclosure features a pre-filled straw with a cross-slit valve to be used for oral administration of any liquid soluble ingredients (11), preferably granules (24), preferably for oral drug administration, characterized in that a straw body (1) consists of two or more segments, which are attached together with a connection (5) and that the straw body (1) on its both ends has a cross-slit valve (2, 3) closure and the valves (2, 3) and the straw body (1) are integrated by molecular adhesion.

In another aspect, this disclosure features a process of manufacturing of the pre-filled straw with cross-slit valve closure on both ends, characterized in that in the first step the first component, preferably thermoplastic, is injected in a first cavity (13) of a mold (12), whereas the shape of the first cavity (13) is in the shape of the straw body (1), than the mold (12) rotates and in the second step the already formed straw body (1) comes in contact with a second cavity (20) with the shape of the valve (2, 3) then the second component, preferably elastomer, is injected into the said cavity (20) so the valves (2, 3) and straw body (1) are attached by molecular adhesion.

BRIEF DESCRIPTION OF THE DRAWINGS

Embodiments of the present invention will be described with the references to the drawings, in which:

FIG. 5 shows the inlet valve, FIG. 6 shows the outlet valve, FIG. 7 shows the injection of the straw, FIG. 8 shows the injection of the valve.

DETAILED DESCRIPTION

The problem mentioned in the Background is solved with a pre-filled straw with cross-slit valve closures on both ends whereby the straw and the straw-valves are integrated in one-piece. The proposed design allows easier production of the straw and its filling. The pre-filled straw according to the invention enables easier production of the straw by multi-component injection molding, i.e. the injection of elastomeric valves onto the polymer straw body.

Figure 1:
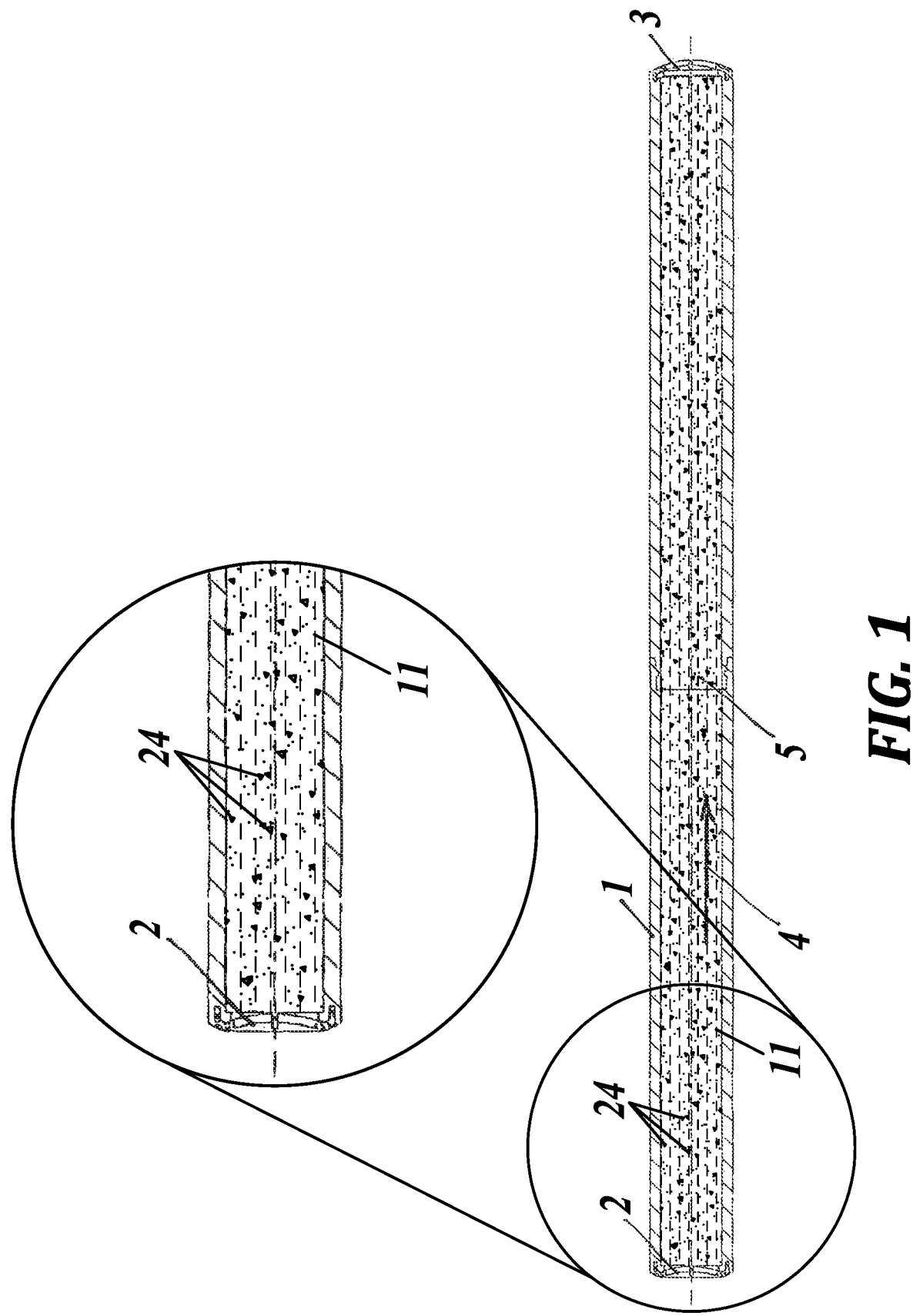
FIG. 1 shows the straw body.

The parts of the pre-filled straw as presented in FIG. 1 are a straw body 1 in tubular form, either round or oblong shape and two cross slit valves 2, 3. Valve 2 is positioned on the liquid inlet and valve 3 on the outlet of the straw. The valves 2, 3 are positioned in the way to allow only one-way flow through the body straw, as presented by arrow 4 in FIG. 1. The valves 2, 3 are initially in closed position, but when suction in the direction of the arrow 4 is applied, both of them are opened and allow the liquid to enter the straw. When suction is stopped, both valves 2, 3 return to closed position.

Figure 2:
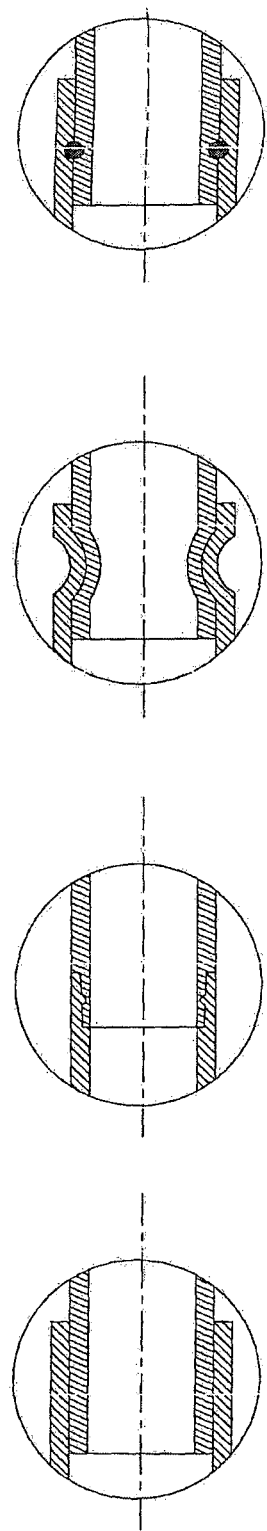
FIG. 2 shows the embodiments of connections between the segments of the straw body inlet valve.

The invention can be applied to the straws with a straw body, consisting of two or even more than two segments. The segments are attached together with connection 5. Several types of connections are presented in FIG. 3. Segments may be attached one to another by capsule like closing system, O-ring, tight fitting, i.e. one part is slightly narrower than the other, or another suitable closure as presented in FIG. 2.

Figure 3:
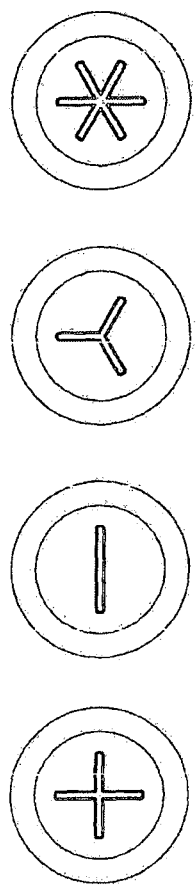
FIG. 3 shows the embodiments of cross slit valves, outlet valve.

In FIG. 3 the slits in the cross slit valves are presented. The slit valves per-se are known. Valves are molded and preferably made of elastomer material. Slits can be cut in a shape of a cross, of a line, of a three-pointed star, of a six-pointed star or any other appropriate form. The cross-slit valves can differ in shapes, as presented in the figure with the concave round shape, duck-bill shape and similar.

Figure 4:
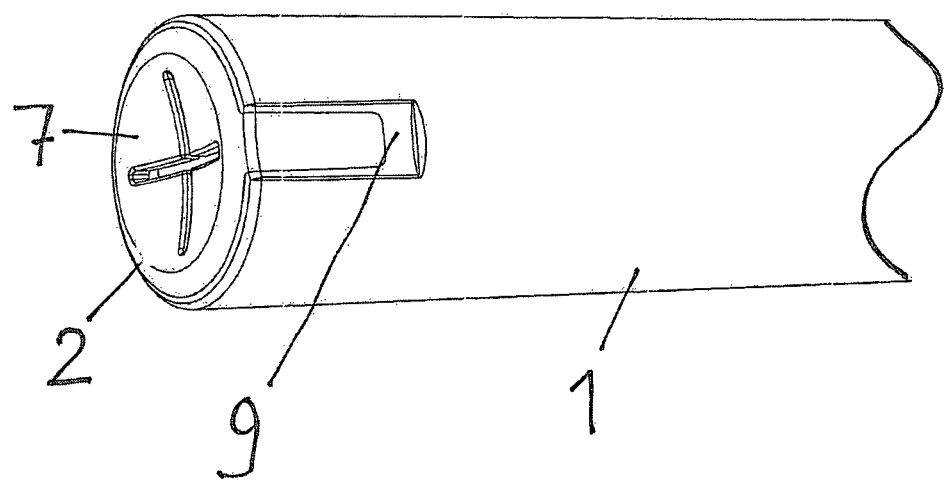
FIG. 4 shows the perspective view of the inlet valve.

The inlet valve 2 according to the invention is presented in FIGS. 4, 5 and is connected and melded to the lower end of the straw body 1. Straw body 1 is made of thermoplast and the valve 2 with a membrane 7 is made of elastomer. The membrane 7 of the inlet valve is bended towards the inside of the straw body 1, i.e. the membrane 7 is concave. The edge of the straw body 1 is shaped to enable larger surface of the connection between the straw body 1 and the inlet valve 2. The said shape is preferably a groove 8, formed inside the edge of the wall of the straw body 1. To enable the injection of the thermoplastic into the valve-shaped mold, a tongue-shaped groove 9 is formed on the surface side on the end of the straw body 1. Said groove 9 enables that the injected thermoplastic flows from the injection unit to fill in the valve 2 mold.

The outlet valve 3 as presented in FIG. 6 has the same structure as the inlet valve 2. The outlet valve 3 is bended towards the outside of the straw body 6, i.e. the membrane 10 is convex.

The inlet and outlet valves 2, 3 with the membranes 7, 10 are injected directly onto both segments of the straw body 1. The straw body 1 has the groove 8 and, during the injection molding process, when the elastomer is injected onto the straw body 1, a junction between both materials, i.e. the thermoplast of the body 1 and the elastomer of valves 2, 3, is formed by the adhesive molecular forces.

FIGS. 5 and 6 depict two component, i.e. thermoplast and elastomer, injection molding process. The process is performed by injecting the first component, preferably polymer, into the mold 12. In the first step the first component is injected thorough the injection nozzle 14 into the channel 15. Then the first component flows through the gate 16 to the appropriate cavity 13 in the shape of straw body 1. The flow enters the mold 12 through the gate 16 into the groove 9. In this cavity 13 the straw body 1 is formed. After this process is completed, the mold 12 changes the configuration in order to initiate the second step of the process.

Before the polymer is cooled-off or is hardened, the tooling configuration is changed, i.e. the mold 12 rotates and changes the configuration in order to initiate the second step of the process. Then follows the injection of the second material, preferably elastomer into the cavity and thus cross slit valve is molded onto the straw body. In this way the valves and straw are attached by molecular adhesion. This approach allows the production cycle time to be shortened.

In the second step as presented in FIG. 6 the already formed straw body 1 comes in contact with the second cavity 20. The second cavity 20 is in the shape of the valve 2, 3. The second component, preferably elastomer, is injected form the injection nozzle 21 through the second channel 22 and enters the cavity 20 through the gate 23. After cooling the finished piece is ejected from the mold 12.

With the said molding process several straw sections are produced which later are to be connected by connections, already described above.

The invention is characterized in that the straw body 1 is consisting of two or more segments, which are attached together with connection 5 and that the straw body 1 on its both ends has a cross-slit valve 2, 3 closure and the valves 2, 3 and the straw body 1 are integrated by molecular adhesion. The inlet and outlet valves 2, 3 are of a slit type. The straw body 1 is preferably made of a thermoplastic material and the valves 2, 3 are preferably made of elastomer material. The edge of the straw body 1 is shaped to enable larger surface of the connection between the straw body 1 and valve 2, 3. The said shape is preferably a groove 8. On the wall on the end of the straw body 1 a tongue-shaped groove 9 is formed on the surface side.

The process of manufacturing of the pre-filled straw with a cross-slit valve closure on both ends, characterized in that first the first component, preferably thermoplastic is injected in a first cavity 13 of the mold 12, whereas the shape of the first cavity 13 is in the shape of the straw body 1, than the mold 12 rotates and in the second step, the already formed straw body 1 comes in contact with the second cavity 20 with the shape of the valve 2, 3, then the second component, preferably elastomer is injected into said cavity 20 so the valves 2, 3 and the straw body 1 are attached by molecular adhesion.

According to the invention a very good prevention against the loss of the straw content is obtained, since both of the cross-slit valves are closed in the time of non-use. The loss of the content during suction is also prevented, as the outlet valve inhibits counter pressure applied into the straw, and inlet valve prevents the loss of the liquid from the straw.

The invention claimed is:

1. A pre-filled straw with a cross-slit valve to be used for oral administration of liquid soluble ingredients, comprising:
   a straw body (1) formed from two or more segments, which are attached together with a connection (5), the straw body having two ends, and
   a liquid soluble ingredient (11) provided within the straw body;
   wherein the segments of the straw body (1) on both its ends have a cross-slit valve (2, 3) closure at the end of the segment; wherein each of the cross-slit valves (2, 3) is positioned to face a direction parallel to the longitudinal axis of the respective segment; and
   each of the valves (2, 3) is attached to the respective segments of the straw body (1) by molecular adhesion.

2. The straw according to claim 1, wherein one of the valves (2, 3) is an inlet valve (2), and a membrane (7) of the inlet valve (2) is of the concave form.

3. The straw according to claim 1, wherein one of the valves (2, 3) is an outlet valve (3), and a membrane (10) of the outlet valve (3) is of the convex form.

4. The straw according to claim 1, wherein the straw body (1) is made of a thermoplastic material.

5. The straw according to claim 1, wherein an edge of the straw body (1), at each end thereof, comprises a groove (8) for connecting the respective valve (2, 3) to the straw body (1).

6. The straw according to claim 1, wherein the valves (2,3) are made of elastomer material.

7. A process of manufacturing of the pre-filled straw according to claim 1, comprising:
   producing each of the two or more segments of the straw body (1) separately using a molding process comprising:
   in a first step, a first component is injected in a first cavity (13) of a mold (12), in which the shape of the first cavity (13) is in the shape of a separate segment of the two or more segments of the straw body (1);
   then the mold (12) rotates and, in a second step, the already formed separate segment of the straw body comes in contact with a second cavity (20) having the shape of a corresponding one of the valves (2, 3);
   then a second component is injected into the second cavity (20), so the valve (2, 3) and the corresponding separate segment of the straw body are attached by the molecular adhesion;
   providing a liquid soluble ingredient (11) into the segments; and
   connecting the separate segments of the straw body with the connection (5) to form the straw body (1).

8. The straw according to claim 1, wherein the liquid soluble ingredient (11) is granules (24).

9. The straw according to claim 1, wherein the liquid soluble ingredient (11) is for oral drug administration.

10. The process according to claim 7, wherein the first component is a thermoplastic material and the second component is an elastomer material.

* * * * *